Karl Jaeger
Werner Scheffel
INVENTORS.

BY Karl F. Ross
Attorney

Karl Jaeger
Werner Scheffel
INVENTORS.

BY Karl F. Ross
Attorney

United States Patent Office 3,432,995
Patented Mar. 18, 1969

3,432,995
ADSORPTION TOWER
Karl Jaeger and Werner Scheffel, Munich, Germany, assignors to Linde Aktiengesellschaft, Wiesbaden, Germany, a corporation of Germany
Filed Nov. 16, 1966, Ser. No. 594,922
Claims priority, application Germany, Nov. 19, 1965, L 52,185
U.S. Cl. 55—179
Int. Cl. B01d 53/04
8 Claims

ABSTRACT OF THE DISCLOSURE

An adsorption tower having an upright cylindrical housing whose upper and lower hoods are provided with an inlet and an outlet for delivering a gas to and removing it from an adsorption chamber at opposite axial ends thereof, the chamber being subdivided into at least a pair of angularly offset adsorption zones by a multiplicity of angularly spaced radial walls lying in respective axial planes of the chamber and subdividing it also into heat exchange zones inwardly of the respective adsorption zones; the zones are of sectoral configuration and are surrounded by an outer partition formed by a multiplicity of perforated plates spanning the radial walls and defining the outer side of each adsorption zone. An inner perforated tube forms a gas-penetrable retaining wall for the adsorption material of each adsorption zone along an inner side thereof. The heat-exchange zones are each provided with a bundle of cooling tubes extending axially within the housing means and forming a core of the tower surrounded by the adsorption zones; the walls in succession about the axis are provided alternately with openings outwardly of the adsorption zones and inwardly of the adsorption zones for passing the gas radially through the zones alternately in opposite radial directions.

---

Our present invention relates to an adsorption tower for the treatment of a carrier gas containing at least one adsorbable component; more particularly, the invention relates to a method of operating an adsorption system in which both adsorption and heat-exchange are carried out, as more generally described in our copending application Ser. No. 592,140, filed Nov. 4, 1966, and entitled, Adsorption System.

It is known that the retention and acceptance of a physically adsorbable component by media of high porosity, e.g. activated charcoal, varies inversely with the temperature. In existing practice, preliminary cooling cannot be permitted to bring the carrier gas to adsorption equipment below the dew point of the adsorbable component. Thereafter, any heat developed in a through-flow adsorption process, or sensibly picked up by the carrier gas, and most particularly in cases where the heat of radio active dissociation is released in the adsorptive mass, continuously raises the temperature of the carrier gas thereby causing the adsorptive process to become progressively less and less efficient. To alleviate this problem, earlier practices made use of heat-exchanger tubes emplaced directly in the adsorbent mass. This system has the disadvantage that the structure of the adsorbent in contact with the tubes was destroyed and the resulting pulverization caused excessive carry-over of adsorbent in the gas stream and raised the pressure drop because of filling of interstices.

In our copending application mentioned above, we provide a series of vertically spaced or stacked zones containing, alternately, an adsorbent material and a bank of cooling or heat-exchange tubes through which the gas passes in succession for alternate subjection to adsorption and cooling. It will be understood that such devices, especially when a multiplicity of stages is involved, require columns of considerable height and, therefore, considerably more complex and larger installations than may be desirable. Furthermore, when the adsorption material alternates with banks of cooling tubes, the thermal characteristics of the cooling zones and of the adsorption zones are so disparate as to give rise to expansion and contraction phenomena which may break up the adsorption mass or cause mechanical failure of the tower. Moreover, exchange of the adsorber is a problem.

It is, therefore, the principal object of the present invention to provide an improved method of and system for the adsorption or removal of entrained matter from a gas stream which extends the principles set forth in my abovementioned copending application and permits the entire system to be considerably more compact and less prone to mechanical difficulties.

A further object of this invention is to provide a method of operating an adsorption system in which thermal deterioration of the mechanical components and breakdown of the adsorbent are minimized.

Another object of this invention is to provide an improved but highly compact multizone adsorption system which involves the alternate cooling and adsorption treatment of a gas stream.

Still another object of our present invention is to provide a method of and an apparatus for the removal of entrained matter, by adsorption, from a gas stream containing radioactive components and particularly suitable for use in conjunction with nuclear reactors and like apparatus for the purification of the gases thereof.

These objects and others which will become apparent hereinafter are attained, in accordance with the present invention, by a method of removing radioactive and other entrained materials from a gas stream, with the aid of a molecular sieve or adsorbent material, which comprises passing the gas stream radially through at least two adsorber zones and an intervening heat-exchange zone for cooling the gas between adsorption treatments alternately inwardly and outwardly while introducing the gas and removing it from these zones in generally axial direction. Thus, according to this invention, the heat exchange and adsorber zones are substantially coaxially disposed in a cylindrical adsorption tower and are compartmented so that the gas passes generally radially through an adsorber zone and a respective heat-exchange zone in one radial direction (e.g. inwardly or outwardly with respect to the axis of the tower) and thence through a heat-exchange zone angularly spaced from the first heat-exchange zone in the opposite radial direction (e.g. outwardly or inwardly). It has been found that such an arrangement is particulary suitable for adsorption processes in which considerable quantities of heat are evolved, i.e. wherein the total heat of adsorption and/or the heat evolved by nuclear disintegration, is so great as to require that the passage through the adsorption zones be evacuated rather quickly and a multiplicity of cooling or heat-exchange zones be provided. This is the case when it is desired to remove adsorbable components such as radioactive xenon 133 from helium. Such an adsorption process may be used in combination with a gas purification or rectification system at a nuclear reactor. In this case, it has been found that a heating of the adsorbent (usually activated charcoal) from temperature of 290° K. to 330° K. reduces by a power of 10% the adsorption capacity of the adsorbent for xenon. Such a temperature rise is possible in even relatively small adsorption zones when radioactive xenon 133 is present.

According to a more specific feature of this invention, a generally cylindrical chamber is subdivided by a plurality of axially extending plates, lying along radially of the chamber, into a multiplicity of angularly spaced compartments of sectoral configuration, each of these compartments being subdivided further into a heat exchange and an adsorber zone with the zones being coaxial with one another. Advantageously, the heat-exchange zone, which is provided with an array of axially extending pipes forming a tube bundle, is of a flow cross-section substantially less than that of the respective adsorber zone so that the velocity and turbulence of the gas passing from the adsorber zone into the respective heat exchange zone is increased and heat transfer facilitated. It has been found to be particularly convenient to dispose all of the heat-exchange zones in a common central core of the tower while the adsorptive media are located in an annular band around and coaxial with the heat-exchange core. Guide means including the aforementioned plates are provided in accordance with the present invention to direct the gas in suction through the angularly spaced compartments and alternately inwardly and outwardly through the zones. Frequently, the adsorber path may be made longer by diverting the gas from one adsorber zone through an adjacent adsorber zone without cooling and thereafter through a pair of heat-exchange zones, although it has been found advantageous to dispose further heat-exchange means outwardly of the adsorber annulus so that the gas emerging from each adsorber zone passes through a heat-exchange means release of the radial direction of its movement.

While the term "adsorber" has been used herein in its customary sense to relate to a substance whose surface activity is such that materials entrained with the gas will adhere to or penetrate the surface of this substance, it will be understood that it is intended as well to refer to materials such as molecular sieves as well as conventional adsorbers such as silica gel and activated charcoal. Frequently, it is advantageous to subject a gas to a variety of adsorbent materials and, for this purpose, each of the adsorber zones may be provided with a different adsorbent.

According to yet another feature of this invention, the adsorber zones extend axially within the cylindrical housing, while inlet and outlet means are provided at each of the adsorber zones on the hoods defining the ends of the column, for removal and introduction of adsorber without necessitating the removal of the centrally disposed tube bundles.

These and other advantages, objects and features of the present invention will become more readily apparent from the following description, reference being made to the accompanying drawing in which.

Figure 1:
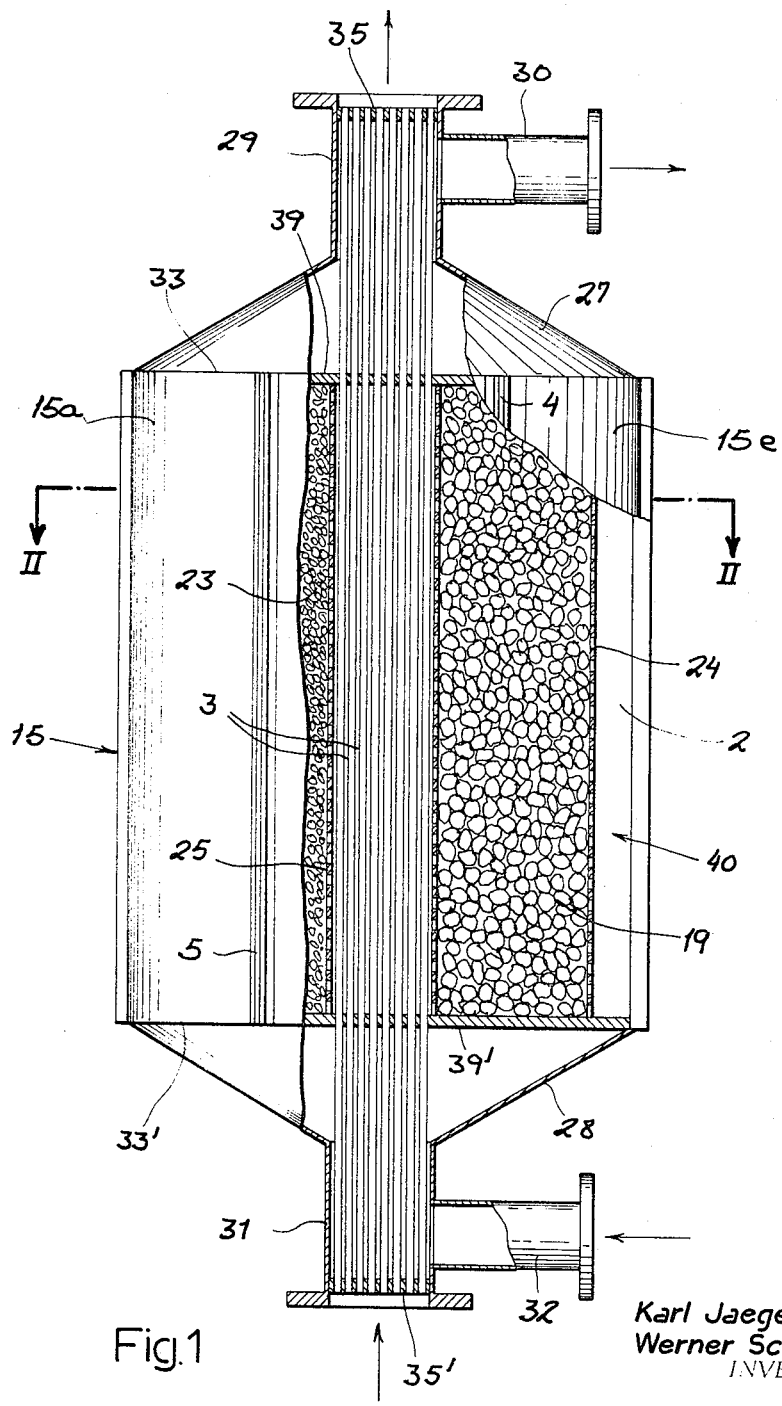
FIG. 1 is a side view of the adsorber tower with a portion of the shell cut away.
Figure 2:
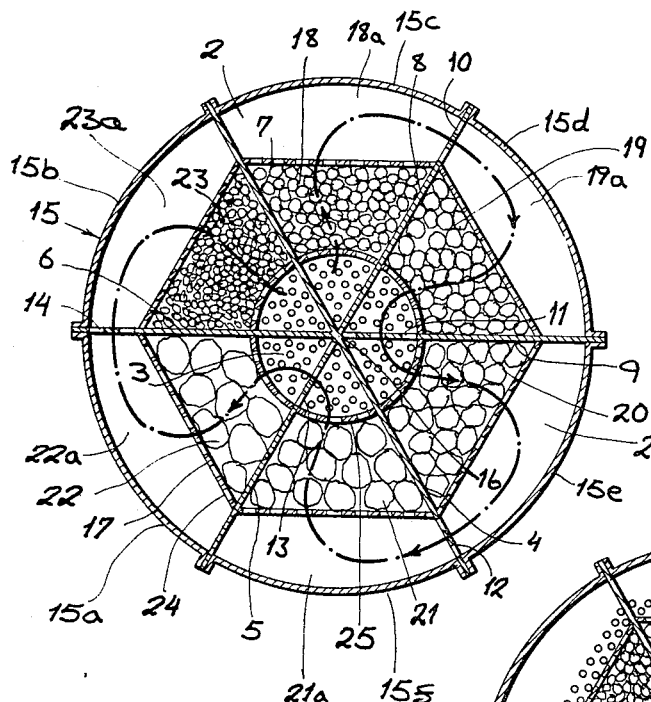
FIG. 2 is a cross-sectional view along line II—II of FIG. 1.

We show in FIGS. 1 and 2 of the drawing a generally cylindrical shell 15, having a vertical axis, the shell is being formed by six flanged segmental panels 15a through 15f and being closed at the top and bottom by coaxial right frustoconical hoods 27 and 28 respectively; the hoods 27 and 28 terminate in elongated cylindrical ducts 29 and 31 (FIG. 1) respectively. Hollow cylindrical outlet and inlet pipes 30 and 32, having axes transverse to the axis of shell 15, communicate with ducts 29 and 31 respectively. Coaxial partition disks 39, 39', axially aligned but spaced within shell 15 and disposed at the junctions 33, 33' of hoods 27, 28 respectively with shell 15, define a cylindrical interior chamber 40.

Six axial plates, 4 through 9, disposed along radii of the chamber, are centrally joined at core 16 and received sealingly at their outer edges between respective adjacent flanges of panels 15a through 15f to subdivide chamber 40 into six segments.

A hollow cylindrical sleeve 25, provided with perforations 34, and smaller in diameter than shell 15 lies coaxially therein between disks 39, 39' and further is sealingly fastened, usually by weld seams, to each plate 4 through 9, along the vertical lines of intersection therewith. Another perforated partition, in the form of a hexagonal prism 24 of plates, coaxial with and within shell 15 surrounds sleeve 25 and is further fastened impermeably, preferably by welding, to each plate 4 through 9 along the corners of the prism.

The inner surface of prism 24, disks 39 and 39', and the outer surface of cylinder 25, together with those portions of plates 4, 5, 6, 7, 8, and 9 therebetween, define sectoral compartments 21 22, 23, 18, 19 and 20 in clockwise order.

An annular space 2 is defined between the axially spaced horizontal plates 39, 39', the external faces of the prismatic partition 24, and the internal surface of shell 15. This space 2 is divided into six compartments, 18a through 23a by the plates 7, 8, 9, 4, 5, and 6. Plate 7 is solid whereas perforations are provided at 10, 11, 12, 13 and 14 in plates 4, 5, 6, 8, and 9; the perforations are located alternately outwardly of partitions 26 and inwardly of sleeve 25, which perforations in conjunction with the perforations 34 of sleeve 25 and perforations 17 of prism 24 define a sinuous path for the gas alternately radially inwardly and outwardly between the various chambers defined above and as shown in FIG. 2. The sleeve 25, which is here illustrated as having a sieve-like configuration, may also be formed by a wire mesh or screen.

Communication between chamber 40 and the compartments defined by hoods 27 and 28 with disks 39 and 39' respectively is provided by cut-outs in disks 39, 39' forming sectoral openings 41, 41' respectively. Opening 41 coincides with that sector determined by plates 6 and 7 as radii and within sleeve 25, and opening 41' coincides with that sector determined by plates 7 and 8 as radii and within sleeve 25.

An array 3 of tubes is axially situated within shell 15 passing sealedly through disks 39, 39' and terminating at tube sheets 35, 35', located in extensions 29, 31 respectively.

In operation the compartments 18 through 23 are filled with adsorptive material, e.g. activated charcoal. The carrier gas is admitted through inlet 32, flowing upward along array 3 of tubes carrying a coolant, and entering into the chamber formed by hood 28 and disk 39'. From this chamber the carrier gas flows through port 41' in disk 39' into the sectoral space defined by plates 7 and 8, the inner surface of sleeve 25 contained therebetween, and disk 39 at the top.

Perforations 34 in sleeve 25 permit the carrier gas to enter into the adsorptive material in compartment 18, the gas emerges therefrom through perforations 17 of prism 24 into space 18a. From 18a the carrier gas passes through perforations 10 in plate 8 into space 19a, from thence through perforations 17 in hexagonal partition 24 into adsorptive material in space 19, again through perforations 34 of cylinder 25 and into cooling contact with that portion of tube bundle 3 within its respective sector. The only escape from this sector is through perforations 11 in plate 9 affording admission to the adjoining cooling sector and from thence to the adjacent adsorptive material in compartment 20.

Following a similar sequence, the carrier gas alternates between the cooling medium and the adsorptive medium, transversely passing in and out of the respective successive zones of the various compartments until at the impervious plate 7 it passes through the port 41 in disk 39, through hood 27 extension 29 to exit duct 30.

Figure 3:
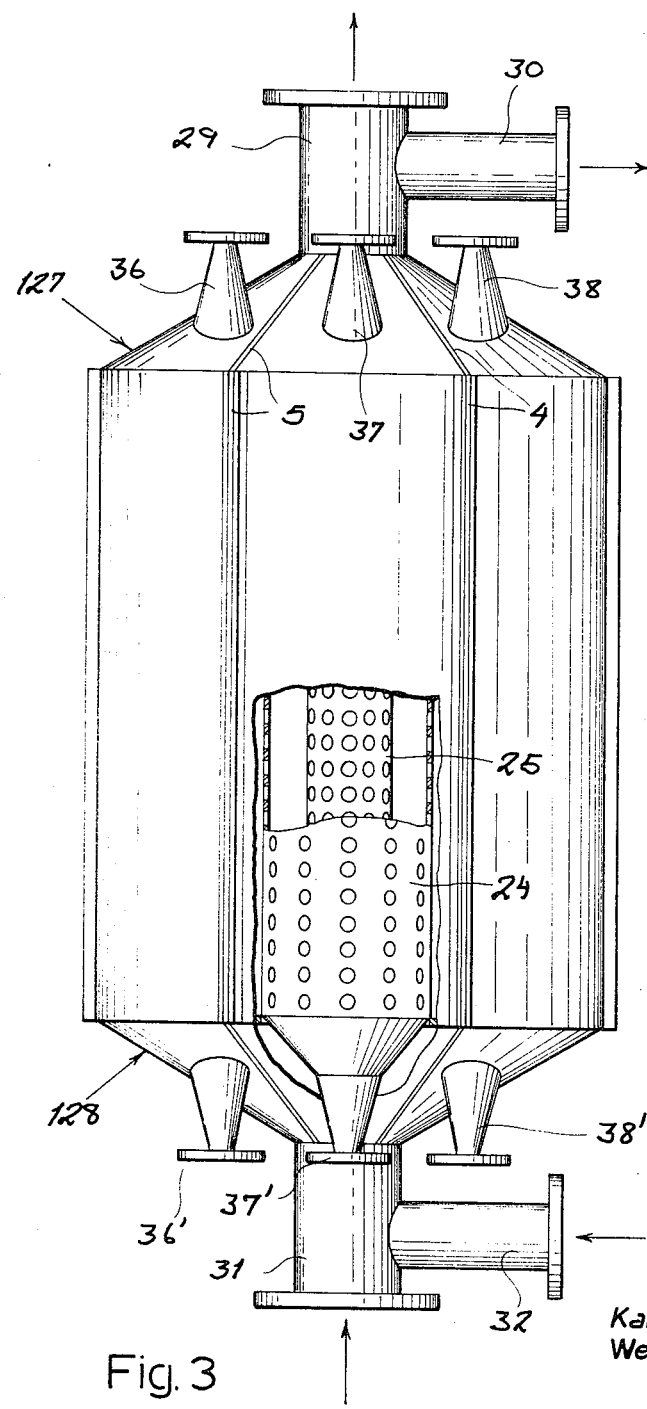
FIG. 3 is a side view of an adsorber tower with connections for replacement of the adsorption media.
Figure 4:
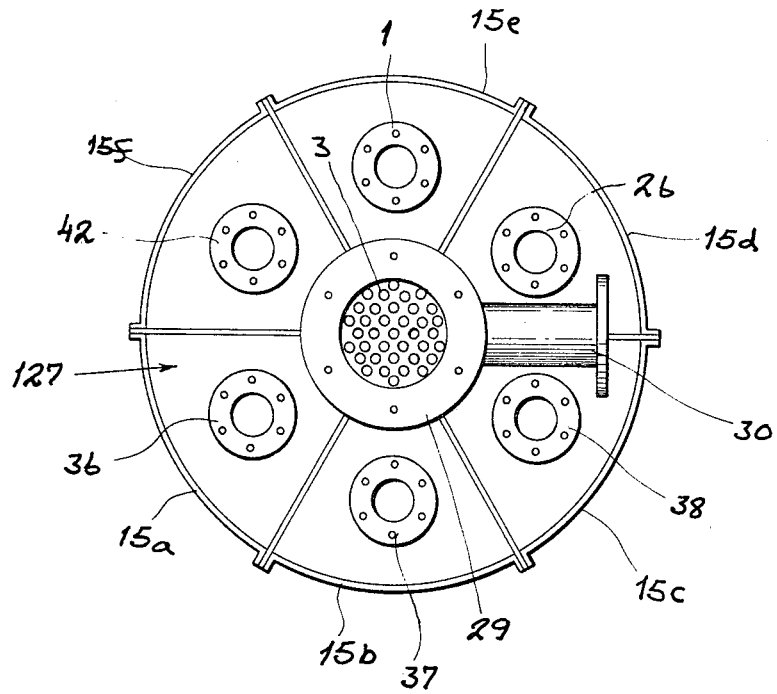
FIG. 4 is a top view of the device of FIG. 3.

The foregoing relates to an adsorber tower as is used with a long-life adsorptive material, requiring relatively few changes of the medium and where dismantling the equipment for adsorber replacement would be costly or dangerous, where the adsorbed material decays at a rate such that accumulations are not disadvantageous and where the adsorbent can be readily regenerated by suitable treatment.

Where frequent changes of the adsorbent material are required, the equipment may be modified as shown in FIGS. 3 and 4.

Inlet ports 36, 37, 38, 42, 1, and 26 are provided at hood 127, for the introduction of the adsorbent material. We provide three outlets 36', 37', and 38', the outlets 42', 1', and 26' corresponding to those above being hidden in this view, for convenient removal of adsorptive material in the hood 128.

Figure 2A:
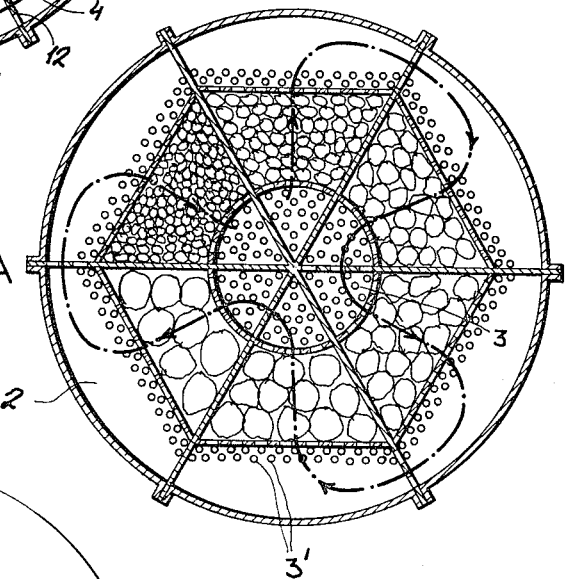
FIG. 2a is a view similar to FIG. 2, but showing another embodiment.
Figure 5:
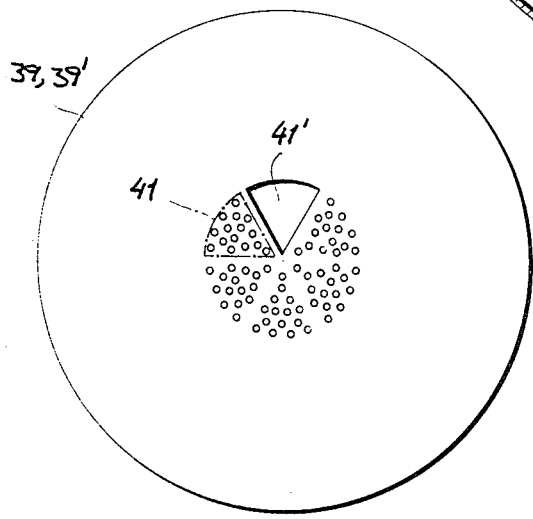
FIG. 5 is a plan view of an internal partition disk of the device of FIG. 1 or of FIG. 4.
Figure 6:
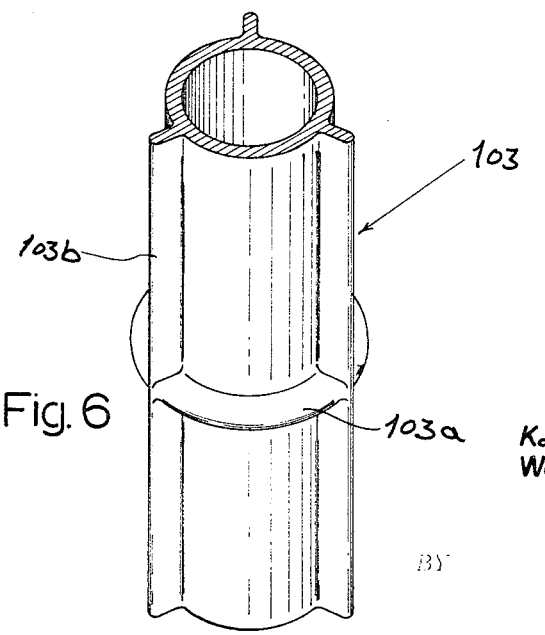
FIG. 6 is an elevational view of a portion of a heat-exchange tube used in the devices of FIGS. 1–5.

It is also desirable often to supplement the array 3 of heat-exchanging tubes with an array 3' located peripherally about the prismatic partition (see FIG. 2a). The heat-exchange tubes 103 (FIG. 6) of the devices of FIGS. 1–5, preferably formed with turbulence-promoting fins or flanges 103 as well as or in place of longitudinal ribs 103b.

It will be seen from the foregoing that the arrangement here disclosed permits an operation in which any heat released in an adsorptive process, or sensibly accumulated by the carrier gas stream, and as particularly mentioned above, released from radioactive components, is substantially continuously removed as the adsorptive process progresses. Of particular interest is the fact that in the final step, when preceding steps have removed the bulk of adsorbable components, exposure to the adsorbent medium is at optimum temperature, insuring a minimum component percentage in the exit carrier gas.

The invention further permits the use of selective adsorbents in the progressive zones, whereby specific components can be removed selectively, or the bulk of any component or components can be removed by initial treatment with an inexpensive medium and the final removal to a minimum level accomplished by the use of a more expensive medium in the final zones.

With the disclosed separation of heat-exchange tubes and adsorptive medium unrestricted circulation of the carrier gas about the tubes is permitted with favorable conditions for heat exchange, and the adsorptive medium is protected from thermal shock disintegration of particle size with attendant loss of intersticial gas passages and carry-over losses. Further, relative cross-sectional areas of the heat-exchange sections and adsorption zones are such that optimum flow and pressure drop conditions are maintained.

Further, the heat exchange sections may be used for either cooling, as indicated above, or heating as is indicated in certain chemical adsorption processes in which adsorption is enhanced by elevated temperatures, or for regeneration cycles.

Our invention has been illustrated in a single example embodiment which is in no way restrictive. Those skilled in the art can make numerous revisions according to design and operational preferences; such revisions are included within the scope of the appended claims.

We claim:

1. An adsorption tower for the successive passage of a gas entraining a substance adsorbable therefrom through a plurality of adsorption stages with an intermediate heat-exchange stage, comprising:

housing means forming a chamber having a plurality of tubes along the axis;

vertical partition means subdividing said chamber into at least a pair of angularly offset sectoral adsorption zones containing an adsorption material capable of retaining said substance, and said tubes into at least a pair of heat-exchange zones radially offset from said said adsorption zones; and means for passing said gas radially in one direction through one of said adsorption zones, radially through said heat exchange zone, and thereafter radially through the other of said adsorption zones in the opposite radial direction.

2. An adsorption tower as defined in claim 1 wherein said partition means includes a plurality of radially extending walls defining said zones, said zones including a heat-exchange zone radially aligned with each of said adsorption zones, said heat-exchange zones each containing a bundle of heat-exchange tubes for circulating a cooling medium through the respective heat-exchange zones, said partition means further comprising gas-permeable means spanning the radial partitions and defining the radial extremities of said adsorption zones, said means for passing said gas through said zone including openings provided in said partitions alternately outwardly of said adsorption zones and inwardly of said adsorption zones about the axis of said chamber whereby said gas is conducted alternately inwardly and outwardly through said zones during its movement about said axis, said housing means including axial inlet and outlet means for delivering said gas to a first of said zones and removing the gas upon its passage through substantially all of said zones at opposite axial ends of said housing means.

3. An adsorption tower as defined in claim 2 wherein each of said gas-permeable means includes a flat perforated plate, said flat perforated plates of said adsorption zones defining a prism within said chamber centered on said axis.

4. An adsorption tower as defined in claim 2, further comprising a respective inlet and a respective outlet at opposite axial ends of said housing means aligned with each of said adsorption zones for replacing the adsorption material therewithin.

5. An adsorption tower as defined in claim 2 wherein said gas-permeable means includes a perforated tube extending centrally within said chamber and forming a core therein, said tube bundles being received within said core.

6. An adsorption tower as defined in claim 5, further comprising an array of additional heat-exchange tubes surrounding said adsorption zones.

7. An adsorption tower as defined in claim 5 wherein said tubes have surface formations for promoting heat exchange through said tubes.

8. An adsorption tower for the successive passage of a gas entraining a substance adsorbable therefrom through a plurality of adsorption stages with an intermediate heat-exchange stage, comprising housing means forming a chamber having an axis; partition means subdividing said chamber into a pair of angularly offset adsorption zones containing an adsorption material capable of retaining said substance, and a heat-exchange zone radially offset from said adsorption zones; and means for passing said gas radially in one direction through one of said adsorption zones, radially through said heat exchange zone, and thereafter radially through the other of said adsorption zones in the opposite radial direction, said housing means being formed as an upright cylinder having an upper and a lower hood provided with inlet and outlet means for delivering said gas to and removing it from said chamber at opposite axial ends thereof; said partition means including a multiplicity of angularly spaced radial walls lying in respective axial planes of said chamber and subdividing it into a multiplicity of said angularly offset adsorption zones and corresponding heat exchange zones inwardly of the respective adsorption zones, said zones being of sectoral configuration, an outer prismatic partition surrounding said adsorption zones and formed by a multiplicity of perforated plates spanning said walls and defining the outer side of each adsorption zone, and an inner perforated tube including all of said heat exchange zones while forming a gas-penetrable retaining wall for said adsorption material of each adsorption zone along an inner side thereof; said heat-exchange zones being each provided with a bundle of cooling tubes extending axially within said housing means and forming a core of said tower surrounded by said adsorption zones; said walls in succession about said axis being provided alternately with openings outwardly of said adsorption zones and inwardly of said adsorption zones to constitute said means for passing said gas radially through said zones alternately in opposite radial directions.

References Cited

UNITED STATES PATENTS

| | | | |
|---|---|---|---|
| 1,773,224 | 8/1930 | Godel | 55—179 |
| 2,753,950 | 7/1956 | Baker et al. | 55—179 |
| 3,212,641 | 10/1965 | Komarmy et al. | 55—74 |

FOREIGN PATENTS

| | | |
|---|---|---|
| 302,071 | 12/1928 | Great Britain. |
| 87,078 | 8/1936 | Sweden. |

REUBEN, FRIEDMAN, *Primary Examiner.*

C. N. HART, *Assistant Examiner.*

U.S. Cl. X.R.

55—208